June 22, 1965  J. A. MAURER ETAL  3,190,414
COMBINATION MOTOR-TRANSMISSION-BRAKE
Filed Feb. 21, 1963
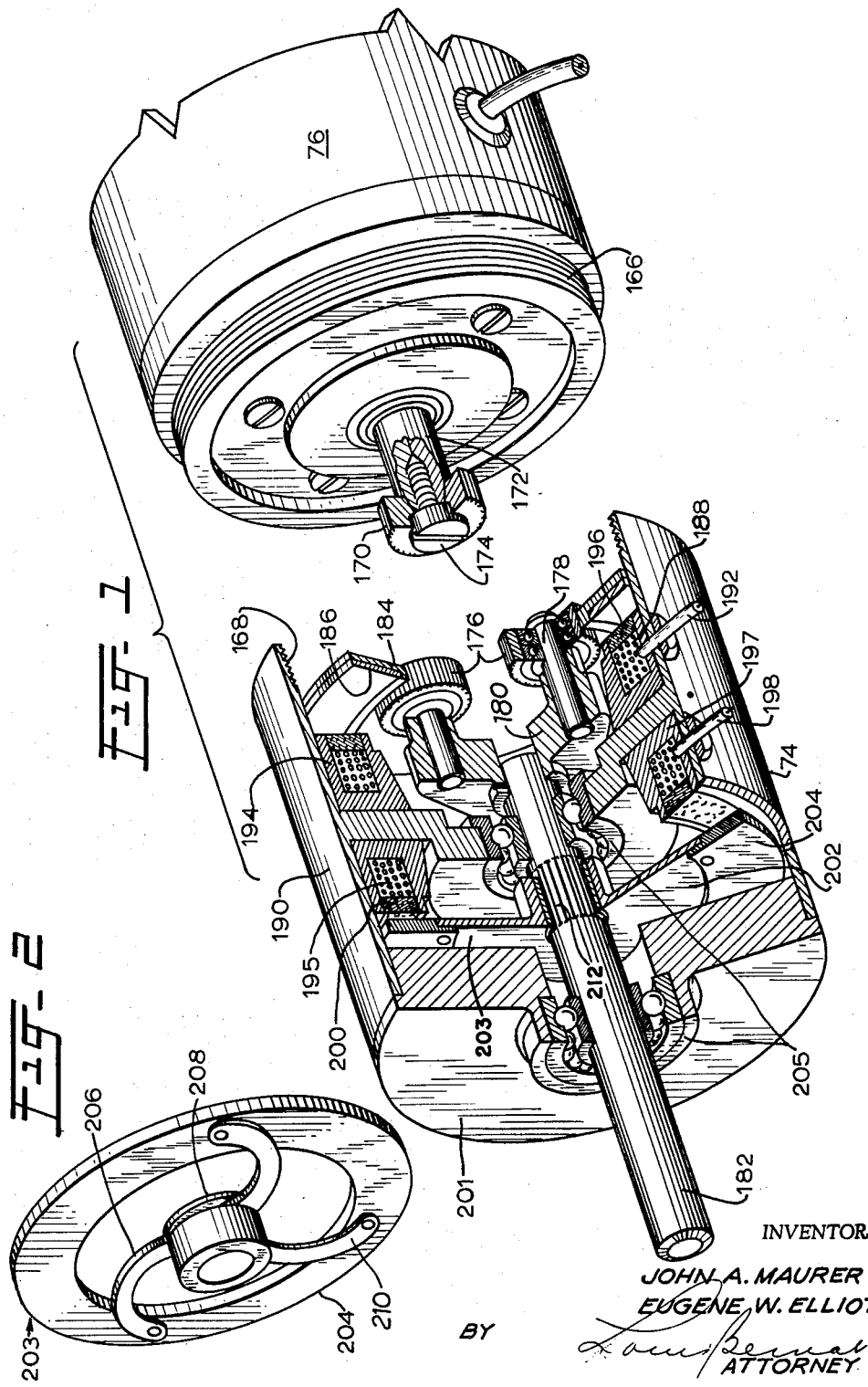
INVENTORS
JOHN A. MAURER
EUGENE W. ELLIOTT
BY
ATTORNEY

United States Patent Office 3,190,414
Patented June 22, 1965

3,190,414
COMBINATION MOTOR-TRANSMISSION-BRAKE
John A. Maurer, New Brunswick, N.J., and Eugene W. Elliott, Barrington, Ill., assignors to Chicago Aerial Industries, Inc., Barrington, Ill., a corporation of Delaware
Filed Feb. 21, 1963, Ser. No. 260,283
9 Claims. (Cl. 192—4)

This invention is a continuation-in-part of our copending application, Serial No. 113,992, filed June 12, 1961, now issued as U.S. Patent No. 3,087,401, and which discloses a Focal Plane Shutter such as employed in photographic apparatus and which utilizes a motor and selectively acutatable transmission brake apparatus of the type herein described.

This invention relates generally to improvements in electric motors having a geared speed reduction integrally formed therewith, and more particularly relates to new and improved electric motor apparatus for providing selective coupling of a motor to a speed changing transmission having an integral brake.

As more fully described in our earlier copending application, a need exists for a motive power unit capable of starting and stopping on a relatively high frequency schedule, such as on the order of six to eight actuations per second, or more. Additionally, in some such systems, the motive power unit is required to accelerate to its output speed and decelerate to its stopped condition in as nearly an instantaneous fashion as possible, and, simultaneously, has to be capable of exerting a graduated drag or braking force on its output shaft during a portion of the time that it is operating at speed. Apparatus embodying all of these characteristics has not been available in the prior art.

Accordingly, it is a general object of this invention to provide a new and improved motor transmission-brake assembly which provides relatively high cycle rates due to its ability to start and stop more rapidly and more positively than heretofore possible.

It is another object of this invention to provide an improved motor-transmission-brake assembly capable of applying braking or retarding power to its output shaft, when that shaft is either at rest or rotating.

It is one important object of this invention to provide an improved transmission-brake assembly which is adapted for selective use with a variety of different motor types due to the ability of the assembly to brake the load and decouple it from the motor during the time that the motor is attaining a desired speed or torque level.

It is another important object of this invention to provide an improved motor-transmission-brake assembly which incorporates an integral gear reduction which may be selectively coupled to its output shaft while simultaneously providing braking functions.

Still another object of this invention is to provide an improved combination motor-brake-gear reduction unit of more compact size than heretofore known.

Another and important object of this invention is to provide an improved motor-transmission-brake assembly employing magnetic coupling devices and brakes having smaller air gaps than heretofore available.

The above and other objects of the invention are achieved in accordance with one illustrative embodiment embodiment of the present invention by utilizing a novel transmission-brake assembly capable of selective and ready assembly to a variety of motors. This novel transmission-brake assembly comprises separately actuatable transmission and brake portions secured to the same output shaft and assembled within a common housing. Additionally, a planetary gear train utilizing a selectively braked ring gear provides the gear reduction achieved by the invention while simultaneously providing the selective coupling of the motor to the output shaft. These and other novel features which are characteristic of the invention are set forth with particularity in the appended claims. The invention itself, however, both as to its organization and method of operation, together with further objects and advantages thereof, will best be understood by reference to the following description taken in conjunction with the accompanying drawings in which:

FIGURE 1 is an exploded and partially broken illustrative view of one embodiment of motor and transmission-brake assembly constructed in accordance with the invention; and FIGURE 2 is a perspective view of an alternate construction of the brake member utilized in the assembly of FIGURE 1.

Referring now to the drawings, and more particularly to FIGURE 1 thereof, there is shown a motor and transmission-brake assembly embodiment illustrative of the principles underlying the present invention. As thereshown, the motor and transmission-brake assembly comprises two general portions, namely, a motor portion 76 and a transmission-brake assembly portion 74. The transmission-brake assembly portion 74, advantageously may be assembly in a generally cylindrical housing 190 which is closed at one end by an end cap 201. An output shaft 182 extending from both sides of end cap 201 is rotatably supported in bearings 205.

The motor portion 76, advantageously may take the form of a governor controlled D.C. motor, of any suitable type well known in the art. Since the operation of motor 76 is well known, it need not be shown or described in detail herein. The inner end of the motor 76 advantageously is provided with a threaded hub 166 which is adapted to be threadedly fastened to the transmission-brake assembly housing 190 at its internally threaded flange 168. While this illustrative embodiment has been disclosed as having its motor and its transmission-brake portions threadedly secured together, and the inventive apparatus is particularly adapted to such connection means, those skilled in the art will readily appreciate that other fastening means may be employed, where desired or necessary.

When these two portions are rotatably threaded to each other, the sun gear 170, which is securely fastened to the output shaft 172 of motor 76 by the threaded fastener 174, is placed in meshing engagement with a plurality of spaced-apart planet gears 176. While only two of such planet gears 176 are shown in FIGURE 4 for purposes of illustration, those skilled in the art will appreciate that a larger or smaller number of such planet gears may be used and, in this illustrative embodiment, four such planet gears are preferred.

Advantageously, each plant gear 176 is rotatably mounted on a shaft 178, with the shafts 178 being disposed in spaced relation about their planet carrier 180. Conveniently, the planet carrier 180 is secured to the transmission-brake output shaft 182, by any suitable means, for rotation therewith.

The several planet gears 176 are meshed with the teeth on the internal periphery of a ring gear 184 so as to cause the ring gear 184 to be rotated in accordance with the rotation of the planet gears when the transmission is in the "off" or decoupled condition. In accordance with a feature of this invention, the ring gear 184 is provided with an inner facing 186 of a highly permeable magnetic material, as for example, the material known commercially as annealed pure iron. A toroidal shaped coil assembly 188 is mounted in the housing 190 of the transmission-brake assembly 74 adjacent the ring gear 184. As shown in FIGURE 1, the toroidal shaped coil assembly 188 comprises a plurality of turns of electrical conductors adapted to be energized from any suitable power source by the power cable 192.

The coil 188 advantageously is mounted in a magnetic pole piece 194, shown as a toroid of channel construction in FIGURE 1. The open end of the pole piece 194 is provided with a bank of high friction material 196, such as that known commercially as "Neoprene" or the like. In the operation of the transmission assembly when the coil assembly 188 is not energized, the ring gear 184 rotates freely in response to the driving power of motor 76, since it is spaced from the friction band 196. When electric power is supplied to the power cable 192 to place the transmission in operation, the coil assembly 188 is energized and the magnetic force created at the pole structure 194 attracts the ring gear 184 so as to place the highly permeable magnetic material 186 in frictional contact with the friction band 196. This stops the rotation of ring gear 184 even though the output shaft of motor 76 continues to rotate.

Those skilled in the art will appreciate that under these conditions, the planet carrier 180 is caused to rotate and thereby rotates the transmission-brake output shaft 182. As long as electrical power is supplied to the cable 192 to maintain the coil assembly 188 energized, the transmission will remain in the "on" condition, and the transmission brake output shaft 182 will be rotated in its bearings. When the electrical power at the cable 192 terminates and the coil assembly 188 becomes de-energized, the ring gear 184 is no longer attracted to the friction band 196 and therefore, the ring gear 184 will be rotated by the planet gears 176 and the motor 76. Under these conditions, the output shaft 182 will be de-coupled from the input driving motor 76 until the next transmission energizing operation.

In accordance with another feature of this invention, a brake assembly is provided in the transmission-brake housing 190 adjacent the clutch assembly, and, its operation is similar in many respects to the operation effecting actuation of the transmission. The brake assembly comprises a toroidal shaped brake coil assembly 195 which is formed of a plurality of conducting turns and which is positioned within a channel in a toroidal shaped pole piece 197. The open end of the channeled torodial shaped pole piece 197 is provided with a band of friction material 200, such as a band of "Neoprene" or the like.

A brake member 203 comprising a relatively thin disc 202 is secured to the transmission brake output shaft 182 by suitable means, such as a spline 212 which will permit it to be axially slideable with respect to the output shaft 182, but will prevent its rotation thereon. Conveniently, the brake member 203 is positioned adjacent the brake coil assembly 195 and is provided with a brake ring of a highly permeable magnetic material, such as the ring 204 at the outer periphery of disc 202. Brake ring 204 is fixedly secured to disc 202, as by riveting or some other suitable fastening means. Those skilled in the art now will appreciate that when the brake coil assembly 195 is energized through its electrical power cable 198, the disc 202 is magnetically attracted to the coil assembly 195 of the brake to cause ring 204 to frictionally engage the friction band 200. Since the disc 202 is keyed for non-rotation on the transmission-brake output shaft 184, this frictonal engagement between the brake ring 204 and the friction band 200 serves to retard and stop the rotation of the output shaft 182.

Another and mechanically attractive alternative embodiment in the construction of the brake member 203 is shown in FIGURE 2. As thereshown, a modified flat disc spring 206 is employed in place of disc 202. A modified flat disc spring 206 comprises a center hub portion 208 and a plurality of thin flexible arms 210 radiating outward therefrom. The arms 210 of the modified flat disc spring 206 are secured to a hub 208 in any suitable manner and brake ring 204 is secured to the outermost end portions of the radiating arms 210 of the modified flat disc spring 206.

It is an advantageous feature of this invention that with the use of the FIGURE 2 embodiment, the unit cost is reduced and it is possible to avoid the mechanical complexity necessary when splines or their equivalent are used to permit disc 202 to be axially slideable upon shaft 182. When employing the construction of FIGURE 2, the hub 208 is fixedly secured to the shaft and lateral motion of the brake ring 204 is achieved by utilizing the flexure capabilities of modified flat disc spring 206.

While the foregoing is a description of a specific embodiment of the present invention, it will of course be evident that this embodiment is merely illustrative, and that various modifications and alternate constructions can be made without departing from the true spirit and scope of the invention. For example, the brake-transmission assembly may be used in locations separate from its drive motor. Also, while shaft 182 has been described as an output shaft and shaft 172 has been described as an input shaft to the brake-transmission assembly, these input-output designations can be reversed where it is desired to obtain a speed increase rather than a speed decrease. Therefore, it is intended by the appended claims to cover all of such modifications and alternate constructions as fall within the true spirit and scope of the invention.

What is claimed as the invention is:

1. An improved electrically actuated transmission-brake comprising a housing, a shaft supported for rotation in said housing and extending therefrom, brake ring means secured to said first shaft and concentric thereabout, planetary gear means comprising a planet carrier, a ring gear and a sun gear, and having its planet carrier secured to said shaft, its ring gear axially slideable upon the planet gears carried by the planet carrier, and its sun gear centered between the planet gears and in engagement therewith, first ring shaped electromagnet means secured in said housing in close proximity to said ring gear, said first ring shaped electromagnet means being adapted when energized to attract said ring gear and by frictional engagement therewith to prevent the rotation of said ring gear, and second ring shaped electromagnet means secured in said housing in close proximity to said brake ring means, said second ring shaped electromagnet means being adapted when energized to attract said brake ring and by frictional engagement therewith to retard the rotation of said shaft.

2. An improved transmission-brake assembly in accord with claim 1 wherein said brake means comprises modified flat disc spring ring support means secured to said shaft, and a brake ring at least partially comprised of a magnetic substance secured to said ring support means.

3. An improved electrically actuated transmission-brake comprising a housing, an output shaft supported for rotation in said housing and extending therefrom, brake ring means secured to said output shaft, planetary gear means comprising a planet carrier secured to said output shaft, a ring gear and a sun gear, first ring shaped electromagnet means secured in said housing in close proximity to said ring gear, said first ring shaped electromagnet means being adapted when energized to attract said ring gear and by frictional engagement therewith to prevent the rotation of said ring gear, and second ring shaped electromagnet means secured in said housing in close proximity to said brake ring means, said second ring shaped electromagnet means being adapted when energized to attract said brake ring and by frictional engagement therewith to retard the rotation of said output shaft.

4. An improved transmission-brake assembly comprising a housing having a plurality of shaft supporting bearings therein, a shaft supported for rotation in said bearings and extended exterior of said housing, brake ring means secured to said shaft, planetary gear means having a planet carrier secured to said shaft, a ring gear and a sun gear, first toroidal shaped electromagnet means positioned in said housing in spaced relationship to said ring gear, said first toroidal shaped electromagnet means being adapted when energized to attract said ring gear and by frictional engagement therewith prevent the rotation of said ring gear whereby rotation of said sun gear will be communicated to said shaft, and second toroidal shaped electromagnet means positioned in said housing in spaced relationship to said brake ring means, said second toroidal shaped electromagnet means being adapted when energized to attract said brake ring means and by frictional engagement therewith to retard the rotation of said shaft.

5. An improved transmission-brake assembly comprising a housing having a plurality of shaft supporting bearings therein, an input and an output shaft each supported for rotation in said bearings and extended exterior of said housing, brake ring means secured to said output shaft, planetary gear means comprising a planet carrier, a ring gear and a sun gear, and having its planet carrier secured to said output shaft, its ring gear axially slideable upon the planet gears carried by the planet carrier, and its sun gear in engagement with said planet gears and secured to said input shaft, first toriodal shaped electromagnet means positioned in said housing in spaced relationship to said ring gear, said first toroidal shaped electromagnet means being adapted when energized to attract said ring gear and by frictional engagement therewith to prevent the rotation of said ring gear whereby rotation of said input shaft will be communicated to said output shaft, and second toroidal shaped electromaget means positioned in said housing in spaced realtionship to said brake ring means, said second toroidal shaped electromagnet means being adapted when energized to attract said brake ring means and by frictional engagement therewith to retard the rotation of said output shaft.

6. An improved motor-transmission-brake assembly comprising a housing, an output shaft supported in said housing for rotation, a motor secured to said housing, said motor having a rotatable shaft, brake ring means secured to said output shaft, planetary gear means comprising a planet carrier, a ring gear and a sun gear, and having its planet carrier secured to said output shaft, its ring gear axially slideable upon the planet gears carried by said planet carrier, and its sun gear secured to said motor shaft and meshed with said planet gears, first electromagnet means secured in said housing in close proximity to said ring gear, said first electromagnet means being adapted when energized to attract said ring gear and by frictional engagement therewith to prevent the rotation of said ring gear whereby said motor shaft is coupled for rotation to said output shaft, and second ring shaped electromagnet means secured in said housing in close proximity to said brake ring means, said second ring shaped electromagnet means being adapted when energized to attract said brake ring and by frictional engagement therewith to retard the rotation of said output shaft.

7. An improved motor-transmission-brake assembly in accord with claim 6 wherein said brake means comprises modified flat disc spring ring support means secured to said output shaft.

8. An improved motor-transmission-brake assembly comprising a housing having a plurality of shaft supporting bearings, an output shaft supported in said bearings for rotation and extending both interior and exterior of said housing, a motor positioned in spaced relationship to said housing, said motor having a rotatable output shaft, brake ring means splinedly secured to said output shaft, planetary gear means comprising a planet carrier, a ring gear and a sun gear, and having its planet carrier secured to said output shaft, its ring gear axially slideable upon the planet gears carried by said planet carrier, and its sun gear secured to said output shaft of the motor and meshed with said planet gears, first ring shaped electromagnet means secured in said housing in close proximity to said ring gear, said first ring shaped electromagnet means being adapted when energized to attract said ring gear and by frictional engagement therewith prevent the rotation of said ring gear whereby the output shaft of said motor is coupled for rotation to said output shaft, and second ring shaped electromagnet means secured in said housing in close proximity to said brake ring means, said second ring shaped electromagnet means being adapted when energized to attract said brake ring and by frictional engagement therewith retard rotation of said output shaft.

9. An improved transmission-brake assembly comprising a housing having a plurality of shaft supporting bearings therein, an input and an output shaft each supported for rotation in said bearings and extended exterior of said housing, planetary gear means comprising a planet carrier, a ring gear and a sun gear, and having its planet carrier secured to said output shaft, its ring gear axially slideable upon the planet gears carried by the planet carrier, and its sun gear in engagement with said planet gears and secured to said input shaft, and actuating means positioned in said housing in spaced relationship to said ring gear, said actuating means being adapted when energized to prevent the rotation of said ring gear and thereby couple said input shaft to said output shaft and when de-energized to permit the rotation of said ring gear and thereby decouple said input shaft from output shaft.

References Cited by the Examiner

UNITED STATES PATENTS 1,706,109  3/29  Dodge _____ 192—4
2,519,118  8/50  Curtis et al. _____ 74—785

FOREIGN PATENTS 1,239,966  7/60  France.

DAVID J. WILLIAMOWSKY, *Primary Examiner.*